United States Patent [19]

van der Lely

[11] 4,350,208

[45] Sep. 21, 1982

[54] PLOUGH

[76] Inventor: Cornelis van der Lely, 7 Brüschenrain, Zug, Switzerland

[21] Appl. No.: 189,332

[22] Filed: Sep. 22, 1980

[30] Foreign Application Priority Data

Sep. 21, 1979 [NL] Netherlands .......................... 7907032

[51] Int. Cl.³ ...................... A01B 15/08; A01B 79/00
[52] U.S. Cl. ........................................... 172/1; 172/33
[58] Field of Search ................... 172/1, 19, 20, 33, 47, 172/66, 67, 125, 167, 716–718; 171/129; 198/403, 404, 658; 271/186, 65; 226/196, 200; 37/DIG. 7

[56] References Cited

U.S. PATENT DOCUMENTS

| | | | |
|---|---|---|---|
| 372,557 | 11/1887 | Morley | 172/33 |
| 1,209,848 | 12/1916 | Kernan et al. | 172/33 X |
| 1,516,561 | 11/1924 | Best | 172/20 |
| 2,617,347 | 11/1952 | Provost | 172/20 |
| 2,663,242 | 12/1953 | Lancaster | 172/19 |

FOREIGN PATENT DOCUMENTS 578916 11/1977 U.S.S.R. ................................ 172/33

Primary Examiner—Paul E. Shapiro
Attorney, Agent, or Firm—William B. Mason

[57] ABSTRACT

A plow has spaced apart furrow cutters and a furrow elevating structure that loosens and raises a continuous wide furrow strip to a furrow turning device during plow travel. The turning device can be an open ended drum that is rotated or stationary. Within the drum, a worm conveyor is rotated that first engages and depresses the furrow top, but as the furrow strip passes through the drum, it is inverted and to some extent, winds around the conveyor so that the furrow strip has a cross section that resembles an inverted shallow U. The inverted and deformed strip is deposited in the furrow being formed. The conveyor is normally located about centrally of the drum interior so that the furrow strip top is first engaged by the conveyor's lower surfaces, but as the strip is urged through the drum, it is inverted and supported on top of the conveyor before being deposited to the rear. The method of cutting, inverting and depositing the deformed continuous furrow strip is claimed.

41 Claims, 8 Drawing Figures

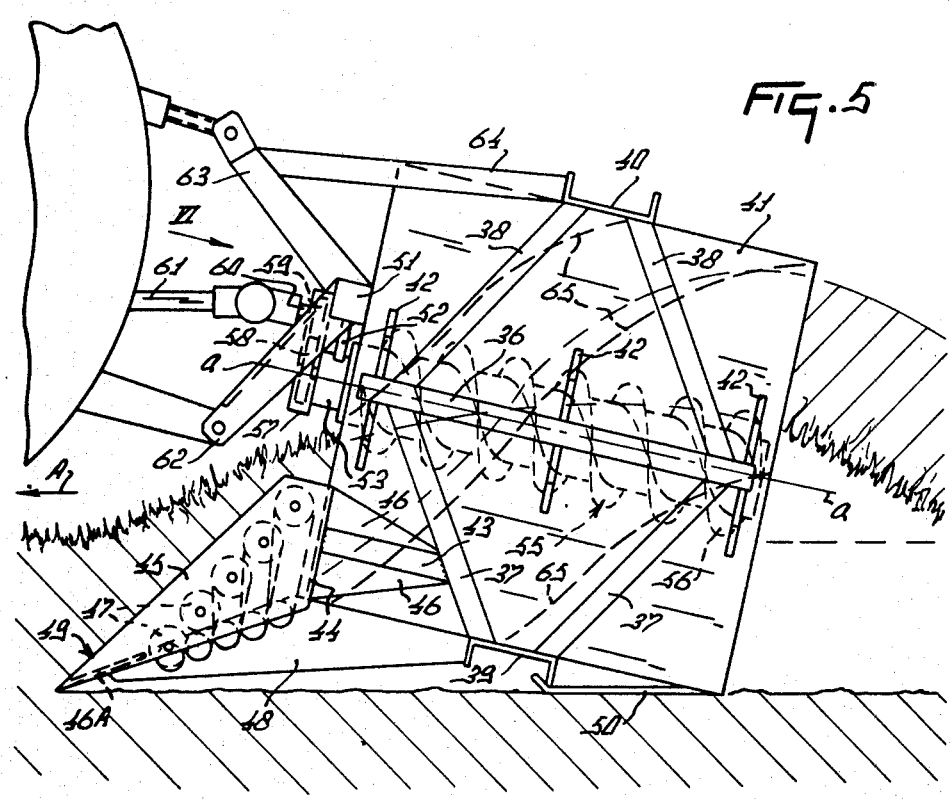

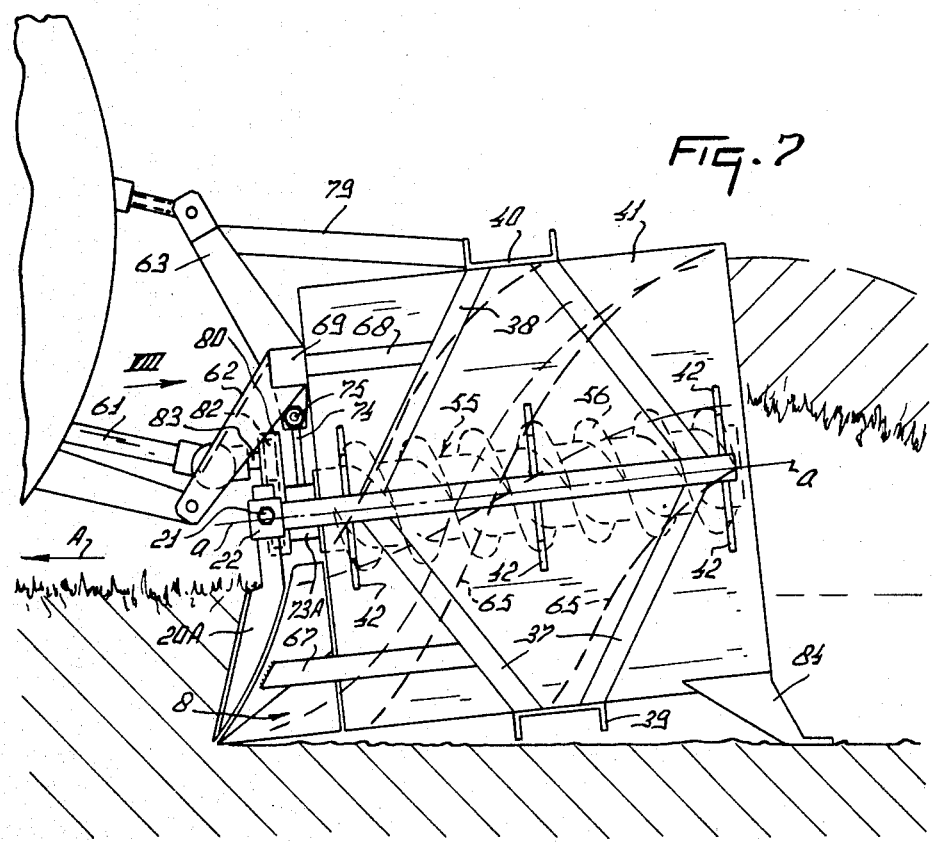
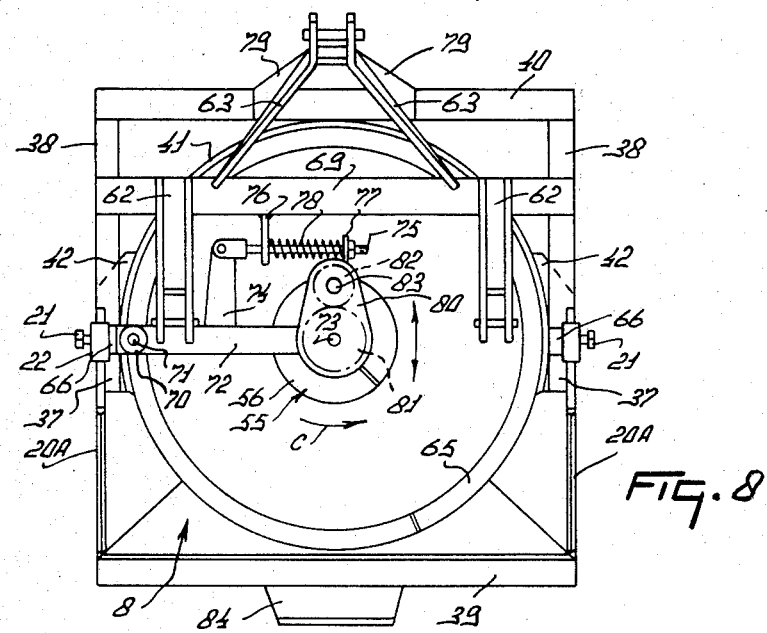

PLOUGH

In order to obtain a large working width, known ploughs are equipped with a plurality of turning devices comprising rigidly mounted mouldboards which are arranged obliquely one behind the other so that the plough extends a comparatively large distance to the rear. This causes a disadvantageous load on the tractor and difficulties in transport.

According to a first aspect of the present invention there is provided a plough comprising a frame and at least one turning device arranged in the frame for at least partly turning a furrow slice by turning it about its longitudinal axis, the working width of the turning device being about 75 cm.

With a construction in accordance with this aspect of the invention, the furrow slice can be turned over more effectively into its own furrow.

According to a second aspect of the present invention there is provided a plough comprising a frame and at least one turning device arranged in the frame for at least partly turning a furrow slice, a member for deforming the sod being provided in front of the turning device, with respect to the intended direction of operative travel of the plough.

According to a third aspect of the present invention there is provided a plough comprising a frame and at least one turning device in the frame for at least partly turning a furrow slice, cutting members being disposed in front of the turning device with respect to the intended direction of operative travel of the plough, in line with the sides of the turning device.

According to a further aspect of the present invention there is provided a method of turning a furrow slice, comprising loosening the furrow slice from the surrounding soil and simultaneously deforming and turning the furrow slice such that the width of the original lower surface of the furrow slice becomes larger than that of the original upper face, the furrow slice being deposited with the original upper face down.

FIG. 5 is a side view of another embodiment of a plough according the invention;

FIG. 6 is a view taken in the direction of the arrow VI in FIG. 5;

FIG. 7 is a side view of a third embodiment of a plough according the invention; and FIG. 8 is a view taken in the direction of the arrow VIII in FIG. 7.

Figure 1:
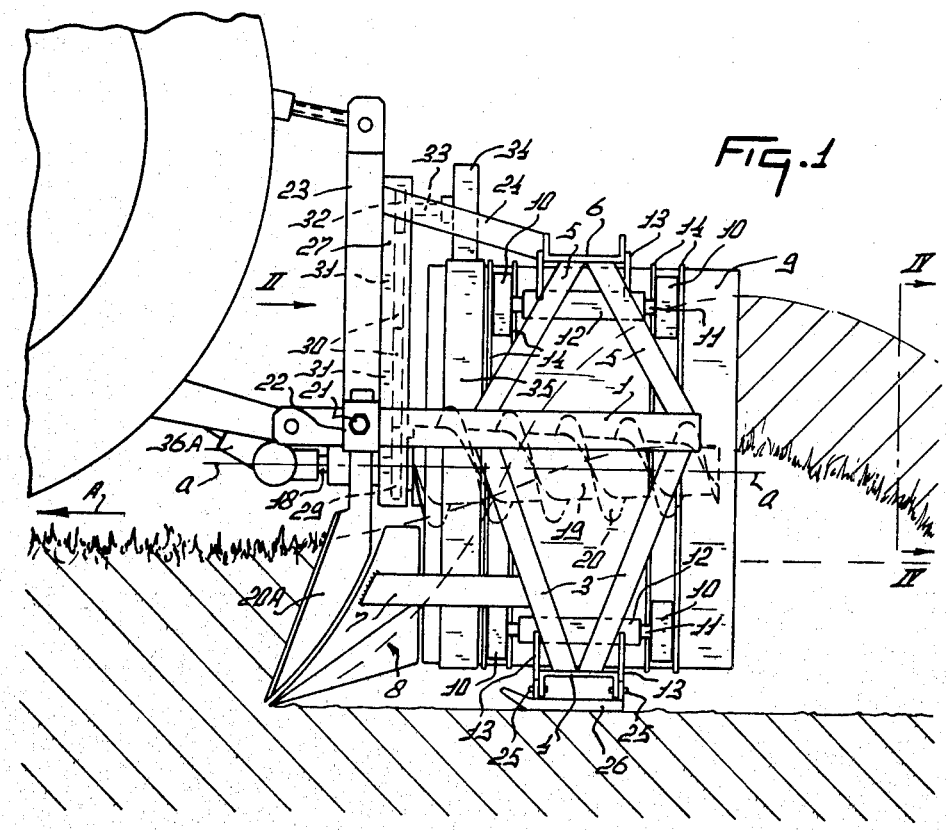
FIG. 1 is a side view of a plough according the invention.
Figure 2:
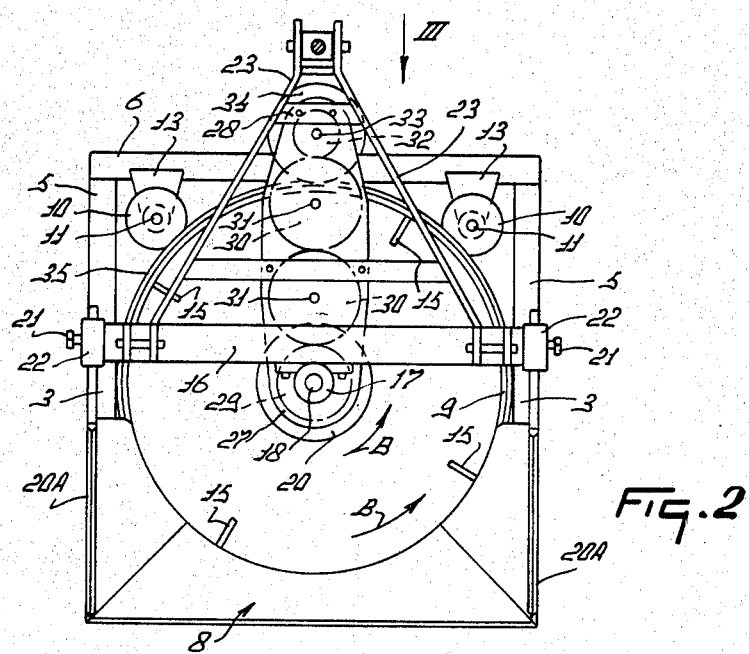
FIG. 2 is a view in the direction of the arrow II in FIG. 1.
Figure 3:
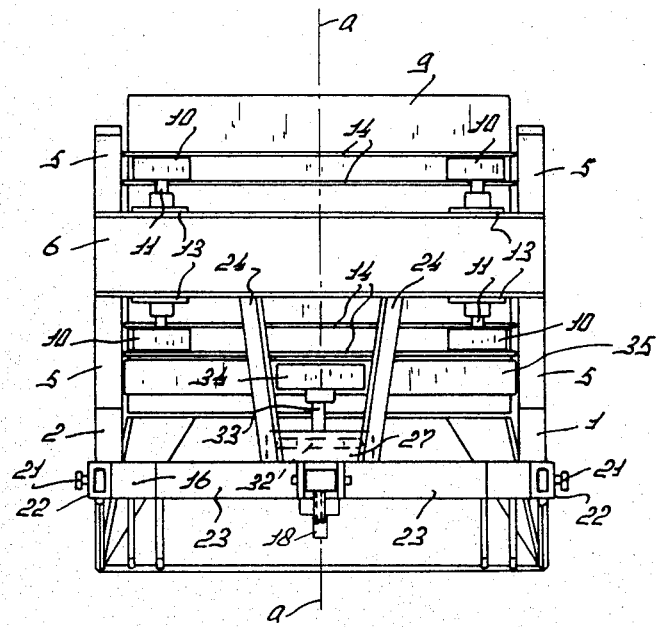
FIG. 3 is a view in the direction of the arrow III in FIG. 2.

The ploughs shown in the Figures are in the form or rotary ploughs. Referring first to FIGS. 1 to 3, the plough comprises a frame having two spaced, substantially horizontal supporting beams 1 and 2 which extend in the intended direction of operative travel of the plough, as indicated by a arrow A. The lower surfaces of the beams 1 and 2 are provided with downwardly converging supports 3. At the lower ends of the supports 3 is fastened a horizontal carrier 4 extending transversely of the direction A. The carrier 4 has a channel-shaped cross-section (FIG. 1) and is disposed with the walls of the channel directed downwards. On the top surfaces of the beams 1 and 2, at the same position as they join the supports 3, there are supports 5 which converge upwardly. The top ends of the supports 5 are interconnected by a transverse beam 6. The transverse beam 6 is generally horizontal and has a channel-shaped cross-section. The beam 6 is arranged with the walls of the channel directed upwards. Just lower than half way down each of the leading supports 3 there is a beam 7 projecting forwardly from the respective support 3. The front ends of the two beams 7 are provided with a soil lifting member 8 constructed in the form of a share. The soil lifting member 8 has, as viewed from the front, a rectangular shape and has a rearwardly ascending bottom wall which meets, at the sides, inwardly inclined, upwardly extending side walls. The bottom wall and the side walls substantially constitute a funnel. At the rear, the soil lifting member 8 meets the front of a guide for a lifted furrow slice, this guide comprising a turning device in the form of a drum 9, the length of which is substantially equal to its diameter. The drum 9 is rotatable about its longitudinal axis a and is supported between the supporting beams 1 and 2 and the supports 3 and 5 by rollers 10 disposed both above and below the drum axis a. The rollers 10 are arranged in pairs on the ends of the shafts 11, which are journalled in bearings 12. The bearings 12 are supported by lugs 13, which are secured to the bottom surface of the beam 6 and the top surface of the carrier 4. The rollers 10 are located between two outwardly projecting annular ribs 14 provided on the outer surface of the drum 9. The inner surface of the drum 9 is provided with soil engaging elements 15 in the form of ribs which extend substantially parallel to the axis a of the drum. The axis a is substantially horizontal in operation. The ribs 15 are distri-buted about the axis a at intervals of about 90°.

The front ends of the beams 1 and 2 are interconnected by a transverse supporting beam 16. Near its middle, the transverse beam 16 is provided on its lower surface with a bearing 17 for a stub shaft 18 located at the front of a central soil conveyor 19 disposed within the drum 9. The conveyor 19 extends almost to the rear of the drum 9 and tapers from front to rear. The periphery of the conveyor 19 is provided with a helical projection 20.

In front of each side wall of the lifting member 8 there is a coulter 20A having a straight cutting edge which is inclined upwardly from front to rear. The top ends of the coulters 20A can be fixed at different vertical levels by means of bolts 21 and holders 22 located at the front of the transverse beam 16 near its ends. A trestle 23 is secured to the front of the transverse beam 16 for attaching the plough to the three-point lifting device of a tractor.

Near the top, the trestle 23 is connected with the beam 6 by struts 24, which slightly diverge from front to rear.

Pivotable skids 26 are secured to the carrier 4 by means of aligned pins 25 extending in the direction A. The skids 26 support the plough during operation. The stub shaft 18 at the front of the conveyor 19 extends into a gearbox 27, which is secured to the beam 16 and to a support 28 near the top of the trestle 23. Inside the gearbox 27 there is a pinion 29 provided on the stub shaft 18 and meshing with one of two indentical meshing larger pinions 30 on stub shafts 31. The upper pinion 30 meshes with a smaller pinion 32. The pinion 32 is mounted on a shaft 33 supported in a wall of the gearbox 27. The shaft 33 carries a roller 34 near its rear end. The roller 34 is provided at its periphery with friction material and co-operates with a band 35 also provided with friction material and disposed near the front end of the drum 9.

Figure 4:
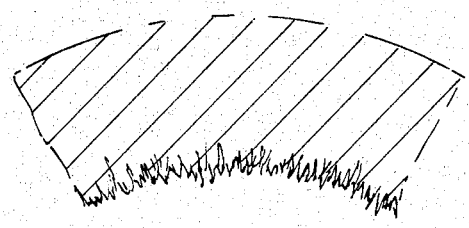
FIG. 4 is a sectional view taken on the line IV—IV in FIG. 1.

During operation, the plough is attached by means of the trestle 23 to the lifting device of a tractor and the stub shaft 18 projecting from the gearbox 27 is coupled by an auxiliary shaft 36 with the power take-off shaft of the tractor. By driving the stub shaft 18, both the conveyor 19 and the drum 9 are rotated in the direction indicated by an arrow B in FIG. 2. As the plough advances, supported by the skids 26, a furrow slice is cut loose by the coulters 20A and the lifting member 8 in the form of a share, this furrow slice having a thickness of about 20 cms and a width of at least 50 cms, preferably 75 cms. The cut furrow slice is lifted by the member 8 to the drum 9. The furrow slice thus moves obliquely upwards and rearwards (FIG. 1). The central region of the top of the furrow slice is engaged by the front end of the conveyor 19 and is displaced rearwardly by the conveyor after being initially pushed downwards. With the assistance of the conveyor the furrow slice is then displaced laterally, upwardly and rearwardly and curved around the conveyor 19 by the drum 9, this displacement being promoted by the ribs 15 inside the drum. As it passes through the drum 9, the furrow slice is turned so that it leaves the rear end of the drum in the state shown schematically in FIG. 1 and is deposited in its own furrow. Owing to the co-operation described above between the conveyor 19 and the drum 9, by which the furrow slice is curved around the conveyor 19, the deposited furrow slice is shaped such that its bottom side (which was the top) is compressed and has a width smaller than that of the top side (which was the bottom). Thus the furrow slice forms a tunnel, as shown in FIG. 4. Since the conveyor 19 tapers from front to rear, the furrow slice is readily discharged. The operation described above carried out by the plough depicted enables a large furrow slice to be effectively turned so that the weeds and other growth on the original top surface are completely covered up, and the furrow slice is deposited on a solid subsoil in the form of a tunnel into which an adequate supply of air can penetrate to convert vegetable remnants into humic compost. Moreover, water can more readily flow down because the curved top side of the deposited furrow slice contributes to the effluence of rain. The conveyor 19 is located centrally of the drum and in addition to compressing the furrow slice during operation is readily capable of shaping the severed furrow slice, despite its large width, into the desired tunnel shape.

The plough shown in FIGS. 5 and 6 comprises a frame having two frame beams 36 extending generally in the direction A. The frame beams 36 are each provided on the bottom and top sides with pairs of converging supports 37 and 38 respectively, which are interconnected by channel-shaped transverse beams 39 and 40 respectively. The transverse beams 39 and 40 are arranged so that their walls extend downwards and upwards respectively, i.e. away from the beams 36. Inside the frame formed by the beams 36 to 40, there is a turning device in the form of a drum 41. The drum 41 is fixed securely to the frame and does not rotate in operation. Each of the frame beams 36 is provided on the top and bottom sides near the ends and near the center with supports 42, to which the drum 41 is secured. A forwardly projecting beam 43 is fastened to the two leading lower supports 37. To the front ends of the beams 43 is fastened a plate 44, which meets the lower part of the drum 41 (FIG. 6). To the upwardly extending edges of the plate 44 are secured forwardly and downwardly inclined plates 45. The connection of the plate 44 with the front ends of the beams 43 is reinforced by gusset plates 46. The leading ends of the plates 45 terminate in points at the front and are interconnected by a flat plate 46A, which has a cutting edge at the front and extends rearwardly up to the leading roller of two adjacent groups of rollers 47 arranged in the form of a V to constitute a share-like soil lifting member. The rollers 47 of each group are rotatably supported at their outboard ends by means of stub shafts in the plates 45 and at their inboard ends by means of stub shafts in a plate 48 located midway between the plates 45. The plate 48 is fastened to the bottom of the drum 41. Each roller 47 tapers from the outboard to the inboard end. The rollers 47 deform the lifted furrow slice so that it can be more readily introduced into the drum. The drum 41 is arranged in the frame with its longitudinal center line a sloping downwardly from front to rear, at an angle of about 15° to the horizontal. Thus the furrow slice lifted by the rollers 47 can be effectively captured. During operation the rear end of the drum 41 is supported on the ground by a skid 50. At the front end of the drum, at a position above the axis a, there is a tranverse beam 51 which extends parallel to the transverse beams 39 and 40. Near its mid-point, the beam 51 carries a downwardly extending support 52 provided with a bearing 53. The bearing 53 supports a stub shaft 54 located at the leading end of a conveyor 55 disposed within the drum 41. The longitudinal center line of the conveyor 55 coincides with the axis a. The conveyor 55 of this embodiment is cylindrical and extends almost to the rear end of the drum 41. The periphery of the conveyor 55 has a helical vane 56. The front end of the stub shaft 54 extends into a gearbox 57, in which there is a pinion 58 mounted on the shaft 54. The pinion 58 meshes with a pinion 59 on a stub shaft 60 in the upper region of the gearbox 57. The stub shaft 60 projects from the front of the gearbox 57 and can be connected by an auxiliary shaft 61 to the power take-off shaft of a tractor.

The beam 51 is provided with downwardly extending and forwardly inclined coupling members 62 for attachment to the lower arms of the three-point lifting device of a tractor. At the top, near the centre, the beam 51 is provided with a trestle 63, which slopes upwardly away from the beam 51 and with which the top arm of the three-point lift of the tractor can be coupled. The top of the trestle 63 is connected with the beam 40 by diverging supports 64.

During operation the plough occupies the position shown in FIG. 5, in which as mentioned, the axis a slopes downwardly from front to rear. The plough is coupled with the three-point lift of a tractor by the coupling members 62 and the trestle 63, and as it is drawn over the ground, the cutting plate 46A and the upwardly extending plates 45 lift a furrow slice having a thickness of about 20 cms and a width of at least 50 cms, preferably 75 cms. The furrow slice is carried upwards by the lifting member 49 constituted by the roller 47 and fed to the front end of the drum 41. During this movement, the sides of the furrow slice are slightly pushed upwards to the middle so that the shape of the furrow slice is more or less adapted to the drum 41. The furrow slice is then in the position shown schematically in FIG. 5. The lifted furrow slice engages the leading end of the conveyor 55 rotating in the direction of the arrow B in FIG. 6, driven by the power take-off shaft of the tractor preferably with a speed of 40-100 rev./min. The conveyor 55 compresses the upper region of the furrow slice. As the furrow slice advances, it is displaced laterally, upwardly and rearwardly also, guided by helical guide elements 65 which extend parallel to one another on the inner surface of the drum 41. The furrow slice is thus wrapped around the conveyor 55 and is delivered from the rear end of the drum in the condition described above for the first embodiment. The guide elements 65 extend from the front side of the bottom of the drum-shaped turning device and cover a circumferential angle of at least 180° and preferably 270°. As with the previous embodiment, the co-operation between the rotating conveyor 55 and the drum 41 achieves a turning of the furrow slice and shapes it such that it can be deposited in the manner shown in FIG. 4 on the solid base of its own furrow. The length of the drum 41 in this embodiment is, as before, substantially equal to its diameter so that the machine is compact.

Another possible construction for the plough is shown in FIGS. 7 and 8, where parts corresponding with those of the previous embodiments are designated by the same reference numerals.

The frame of the plough comprises two frame beams 66 extending in the direction A. As in the second embodiment, the frame beams 66 are provided on the bottom and top sides with pairs of converging supports 37 and 38, interconnected at the top and bottom ends respectively by means of channel-section transverse beams 39 and 40 respectively. Inside the frame formed by the members 66, 37, 38, 39 and 40, the drum 41 is fixed in the same manner as in the preceding embodiment. A lifting member 8 is carried by forwardly extending beams 67 fastened to the leading supports 37. As in the first embodiment, knife coulters 20A are arranged at the front of the frame beams 66. Just above the center of the supports 38 are fixed beams 68 projecting forwardly in the direction A. The front ends of the beams 68 are interconnected by a transverse beam 69. The left-hand frame beam 66, as seen in FIG. 8, is provided with a bearing 70 for a shaft 71 projecting forwardly in the direction A. The shaft 71 is substantially parallel to the longitudinal axis a of the drum 41. An arm 72, which extends inwardly towards the axis a, is pivotable about the shaft 71. At its inner end, the arm 72 is provided with a stub shaft 73 journalled in a bearing 73A. The stub shaft 73 is provided on the front end of the conveyor 55 extending within the drum 41.

Approximately midway along its length, the arm 72 is provided with an upwardly extending support 74, which is pivotally connected to a forked end of a substantially horizontal rod 75. The rod 75 passes through an opening in a plate 76 fastened to the bottom side of the frame beam 69. Near the end of the rod 75 away from the support 74 there is a stop 77. Between the stop 77 and the plate 76 there is a compression spring 78 which surrounds the rod 75. This construction means that the conveyor 55 can deflect as a whole in a vertical direction with respect to the drum 41 against the effect of the compression spring 78. This deflection takes place about the shaft 71 extending substantially in the direction A and disposed at the same vertical level as the rotary axis of the conveyor. The force of the spring 78 is adjustable. Like the beam 51 of the prece-ding embodiment, the beam 69 is provided with means for attaching the plough to the three-point lifting device of a tractor. The trestle 63 is connected by diverging supports 79 with the beam 40. The stub shaft 73 at the front of the conveyor 55 extends into a gearbox 80, in which a pinion 81 is mounted on the shaft 73. The pinion 81 meshes with a smaller pinion 82 on a shaft 83 journalled in the gearbox 80 and projecting forwardly from the bearbox. The shaft 83 can be connected by an auxiliary shaft 61 with the power take-off shaft of the tractor. As in the preceding embodiment, the inner surface of the drum 41 has three substantially equidistant, helical guide strips 65 extending rearwardly from the bottom and front side about the longitudinal axis of the drum (FIG. 7). Each of the guide strips 65 runs around a circumferential angle of at least 180°, preferably 270°. At the rear the drum 41 is provided near the centre with a skid 84 which supports the plough on the ground during operation. The longitudinal axis a of the drum and the normally coincident rotary axis of the rotating conveyor 55 slope upwardly from front to rear at an angle of about 5° to the horizontal.

The embodiment shown in FIGS. 7 and 8 operates in a manner largely corresponding with that of the preceding embodiments. The coulters 20A and the lifting member 8 in the form of a share cut away and lift a furrow slice from the surrounding soil, the furrow slice having a thickness of about 20 cms and a width of about 75 cms. This furrow slice is fed from the rear of the share 8 to the stationary drum 41, where the furrow slice, whose path of movement is schematically indicated in FIG. 7, is captured by the front end of the rotating conveyor 55, initially pressed downwards and turned in the direction, indicated by an arrow C in FIG. 8. As the furrow slice passes through the drum 41, it is deformed and inverted in the same manner as in the preceding embodiment with the aid of the helically extending guide strips 65 on the inner surface of the drum 41. The resilient mounting of the conveyor ensures a smooth engagement with the furrow slice, while clogging can be avoided. It will be appreciated that the resilient mounting of the conveyor may also be employed in the two preceding embodiments. Since the stationary, drum 41 slopes upwardly from front to rear, the co-operation of the lifting member 8 with the drum 41 is improved. The furrow slice, at least 50 cms and preferably 75 cms wide to be lifted by the plough described above has a width such that the intended inversion and deformation can be effectively carried out in the manner described above.

While various features of the plough that have been described, and that are illustrated in the drawings, will be seth forth in the following claims as inventive features, it is to be noted that the invention is not necessarily limited to these features and that it encompasses all of the features that have been described both individually and in various combinations.

I claim:

1. A plow comprising a frame and furrow forming means adjacent the front of the frame, said forming means including cutting members positioned to loosen a wide, continuous furrow strip across the width of said plow during travel, elevating means to the rear of said members and a furrow strip turning device to the rear of said elevating means, said device comprising at least one rotary member that engages the continuous strip and urges the strip from the front of the device to the rear while supporting and inverting said strip, driving means connected to rotate said device and deposit the inverted strip in the furrow being formed, said elevating means being a furrow deforming member, said deforming member comprising two groups of rollers arranged in V-shape.

2. A plow as claimed in claim 1, in which said cutting members include spaced apart, upwardly extending blades that define the width of the strip being loosened, said blades being spaced apart by about 75 cms.

3. A plow as claimed in claim 1, wherein a rotatable conveyor is housed within the drum and the rotary axis of said conveyor is within the drum and the rotary axis of said conveyor is substantially parallel to the rotary axis of the drum.

4. A plow as claimed in claim 3, wherein both the drum and the conveyor are mechanically driven in the same direction and their axes of rotation substantially coincide.

5. A plow as claimed in claim 4, wherein the rotary axis of the drum and conveyor slope upwardly from the rear.

6. A plow as claimed in claim 3, wherein said drum is supported by a plurality of supporting rollers and said driving means engages the drum adjacent its front end.

7. A plow comprising a frame and furrow forming means adjacent the front of the frame, said forming means including cutting members positioned to loosen a wide, continuous furrow strip across the width of said plow during travel, elevating means to the rear of said members and a furrow strip turning device to the rear of said elevating means, said device comprising a rotary conveyor housed within an open ended drum, said conveyor being spaced from the inner drum sides and said sides having projection means that engage the furrow strip and cooperate with said conveyor to move the strip through the drum, said conveyor being positioned to engage and depress the top of the strip while the latter winds around the conveyor, said conveyor being rotated to support and then deposit the deformed strip, inverted in the furrow being formed.

8. A plow as claimed in claim 7, wherein said cutting members are disposed on each side of said elevating means and the latter comprises a funnel-shaped share.

9. A method of plowing ground, comprising cutting loose a continuous furrow strip, elevating the strip to a rotating worm conveyor that initially engages and depresses the top surface of the strip, turning the strip to invert same while winding and supporting the strip on the conveyor to deform the strip and thereafter continuously depositing the strip with an inverted, shallow U-shaped cross section in the formed furrow.

10. The method of claim 9, wherein the conveyor is rotated at a speed of 10–100 rev./min.

11. A plow comprising a frame and means forming a continuous furrow slice, a furrow slice turning device on said frame to the rear of said forming means, said turning device having open opposite ends and housing a rotatable conveyor, said conveyor being positioned to receive a furrow slice from said forming means and to cooperate with said turning device in displacing a furrow slice as the latter passes through the device before being deposited to the rear of said plow.

12. A plow as claimed in claim 11, in which said conveyor is located substantially centrally on said device.

13. A plow as claimed in claim 12, in which said conveyor is elongate with its longitudinal axis extending in the normal direction of travel.

14. A plow as claimed in claim 13, in which said conveyor tapers from front to rear with respect to the direction of travel.

15. A plow as claimed in claim 13, in which said conveyor is generally cylindrical.

16. A plow as claimed in claim 15, in which said conveyor is a worm conveyor having a helical periphery.

17. A plow as claimed in claim 13, in which said conveyor is rotatably supported adjacent one end only and driving means is connected to rotate said conveyor.

18. A plow as claimed in claim 11, in which said turning device comprises a drum and the axis of said drum extends substantially in the direction of operative travel.

19. A plow as claimed in claim 18, in which the rotary axis of the conveyor substantially coincides with the axis of said drum.

20. A plow as claimed in claim 19, in which driving means is connected to rotate both the conveyor and the drum in the same direction of rotation.

21. A plow as claimed in claim 20, in which the rotational axis of said drum slopes downwardly from front to rear with respect to the direction of travel.

22. A plow as claimed in claim 20, in which the conveyor is displaceably mounted with respect to said drum and pivotably interconnected to said frame.

23. A plow as claimed in claim 22, in which said conveyor is pivotable about an axis extending in the direction of travel and that axis is located substantially at the same vertical level as the rotary axis of said conveyor.

24. A plow as claimed in claim 11, in which said forming means includes a cutting member in front of said turning device, a plurality of rollers being arranged between said cutting member and the turning device to elevate the furrow slice.

25. A plow as claimed in claim 24, in which there are two groups of rollers arranged side-by-side that provide a V-shaped track.

26. A plow as claimed in claim 25, in which the rollers of each group are located one behind the other, with respect to the direction of travel.

27. A plow as claimed in claim 11, in which said turning device is supported by a plurality of supporting rollers mounted on said frame, at least two of said rollers being located in the lower region of said device and at least two of said rollers being located in the upper region thereof.

28. A plow comprising a frame with forward coupling means connectable to a prime mover and means forming a furrow slice connected to said frame, an open ended drum being supported by frame beams to the rear of said forming means and the longitudinal axis of said drum extending in the general direction of travel so that a furrow slice passes through said drum from front to rear, rotatable conveyor means in said drum positioned to receive and assist in turning the furrow slice during operation, driving means connected to rotate said conveyor means and said driving means being connectable to a p.t.o. of a prime mover, a forward transverse frame beam being positioned adjacent the front end of said drum, said driving means including a transmission connected to the conveyor and said transmission being supported by said transverse beam.

29. A plow as claimed in claim 28, in which said conveyor is rotatable about a rotary axis which slopes upwardly, from front to rear.

30. A plow as claimed in claim 28, in which a furrow slice lifting member is arranged in front of said drum and connected to said frame.

31. A plow as claimed in claim 30, in which the lifting member comprises a plurality of rollers arranged between furrow cutting means and said drum.

32. A plow as claimed in claim 31, in which said rollers are arranged in two groups positioned side-by-side in V-shaped fashion, the rollers of each group being tapered in the direction towards the other group.

33. A plow as claimed in claim 28, in which said drum is rotatable about its longitudinal axis and supported at its periphery by supporting rollers, said driving means including a driving roller that frictionally engages said periphery.

34. A plow comprising a frame with forward coupling means connectable to a prime mover and means forming a furrow slice connected to said frame, furrow slice turning means being rotatably mounted on the frame to the rear of said forming means and driving means connected to rotate said slice turning means, a supporting member for said turning means being located in advance thereof, said member providing support for said coupling means, forming means, driving means and furrow slice turning means, said turning device comprising a conveyor in a drum and said conveyor being rotatable about an axis extending in the general direction of travel.

35. A plow as claimed in claim 34, in which said supporting member is a horizontal beam located at a vertical level substantially midway the height of said turning means.

36. A plow as claimed in claim 34, in which said supporting beam comprises further members that support a rotary device of said turning means, said further members extending rearwardly from the supporting beam.

37. A plow as claimed in claim 34, in which a ground support for the plow is located beneath said turning device.

38. A plow as claimed in claim 34, in which said drum is also rotatable about an axis that extends in the general direction of travel.

39. A plow as claimed in claim 34, in which the longitudinal axis of said conveyor substantially coincides with the longitudinal center line of the drum.

40. A plow as claimed in claim 39, in which said conveyor has a helically extending part along the periphery.

41. A plow as claimed in claim 34, in which the conveyor and said drum are connected to said driving means and rotatable.

* * * * *